Feb. 4, 1958 J. A. PICKARD 2,822,321
NEW CARBON PRODUCT AND METHOD FOR MANUFACTURING THE SAME
Filed Jan. 31, 1955 2 Sheets-Sheet 1

Inventor
Joseph A. Pickard
By Norris & Bateman
Attorneys

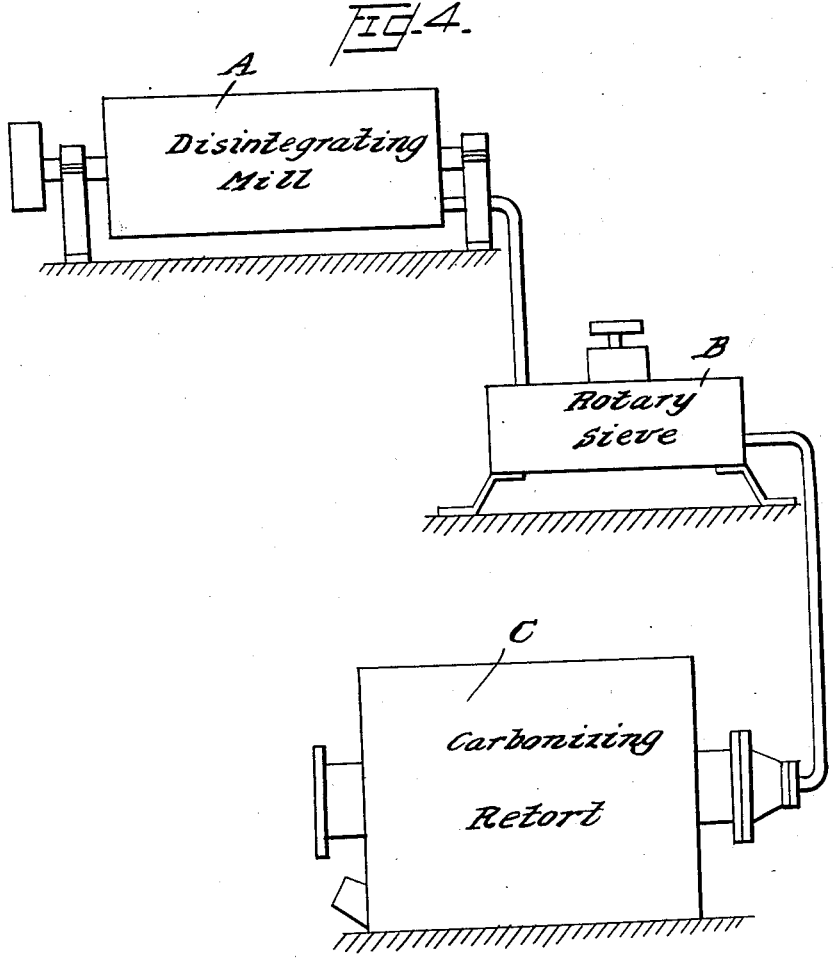

United States Patent Office 2,822,321
Patented Feb. 4, 1958

2,822,321

NEW CARBON PRODUCT AND METHOD FOR MANUFACTURING THE SAME

Joseph Allen Pickard, Hounslow, England

Application January 31, 1955, Serial No. 485,353

Claims priority, application Great Britain February 8, 1954

5 Claims. (Cl. 202—9)

This invention relates to the manufacture of carbon and has for its object to provide an improved carbon product applicable to a variety of industrial and technical purposes; which has improved characteristics and advantages compared with carbon as produced hitherto; and which can be simply and cheaply manufactured.

The chemically inert nature of carbon under most conditions renders it a useful material for a variety of purposes, in some of which it is desirable that carbon should be employed in a physical state giving a very low gravimetric density. The invention is more particularly designed to produce a carbon product suitable for use for filtration purposes. Varieties of carbon at present available for this and similar purposes are in the form of powders which give rather high bulk densities, because the powders are compact and composed of irregularly shaped, minute lumps which pack closely together. For a number of applications, including filtration, this close packing is undesirable and an essential characteristic of carbon produced by means of the present invention is its extremely open structure.

According to the present invention an improved form of carbon is provided whose particles possess a fibrous fern-like or branching formation which produces a reticulate mass wherein the particles interengage or interlock to form an open structure.

The invention will now be described with reference to the accompanying drawings in which:

Figs. 1, 2 and 3 are reproductions of micro-photographs of carbon products obtained by the process according to the invention, and Fig. 4 is a diagrammatic flow sheet showing the apparatus employed to carry out the process of manufacturing carbon according to the invention.

In carrying the invention into effect, the manufacture of the improved carbon product can be applied using fibrous organic substances of many different kinds, and it has been found, in particular, that peat and peat moss are suitable, and, on account of their abundance and cheapness, either is a convenient raw material. The details of manufacture may be varied to give products with properties covering a considerable range. In a typical case, to provide a product suitable for thermal insulation and for the filtration of fluids by transfusion the preparation is as follows:

The peat employed is preferably of the sphagnum type, and should be as free as possible from inorganic matter. The water content is reduced to such a degree as to permit the material to be disintegrated in a mill of known type, e. g. a hammer mill, the sieve mesh size being selected to suit the purpose in view. The disintegration of the peat must be carried out with enough moisture content to avoid brittleness of the fibres, so that a shredded or torn product is produced and not a powder. The disintegrated material is next carbonised in a retort of known type to a predetermined controlled temperature, chosen according to the properties desired and ranging between 450° and 950° C. Low temperatures, 450° to 500° C., give soft products and at higher temperatures harder products, but still with the same structural result. The apparatus for carrying out the process above described is illustrated diagrammatically in Fig. 4 wherein A indicates the disintegrating mill, B a rotary sieve, and C the retort for carbonizing the finely divided material.

On cooling and removing from the retort the product is ready for use without further treatment, such as grading, sieving, or air separation, if it is to be employed for a purpose, such as removal of dust from gases, where it is to operate by mechanical entanglement due to its physical form. This product has been found by microscopic examination to possess a particle structure differing substantially from that of the normal commercial carbon sold for decolourising and similar purposes. The carbon product according to the present invention comprises particles of a branching or fern-like formation which prevents them from packing closely together and ensures in use the existence of a number of irregularly shaped interstices which renders this improved form of carbon particularly applicable to filtration purposes.

The physical structure of the material above described is best illustrated in Figs. 1, 2 and 3 each of which is a reproduction of a micro-photograph.

Figure 1:
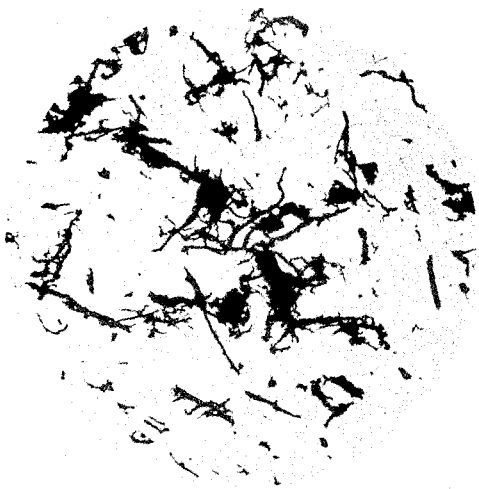
Fig. 1 shows a carbon produced from a cellulosic material which has practically no decolorizing power.
Figure 2:
Fig. 2 shows a carbon produced from peat.
Figure 3:
Fig. 3 shows a carbon produced from peat but from a different locality from that of Fig. 2.

In other cases, where surface action is also to be employed, the product possesses great advantages by presenting a much greater surface per unit weight than can be obtained with other sorts of carbon. When activated by known means, for instance by the action of steam (which may be carried out as the final step of the carbonisation), the efficacy is notably greater than that of activated carbon at present in common use. The production of the improved form of carbon is not restricted to any particular form of apparatus although satisfactory results have been obtained using a tunnel kiln through which the material to be treated is passed in covered boxes. It is also possible to carbonise this material by a continuous process using a rotating kiln wherein the volatile products driven off from the peat can be utilised to furnish sufficient heat to make the carbonisation process self supporting.

I claim:

1. A method of manufacturing a carbon product for use in the separation of fluids, which comprises milling peat or peat moss having a moisture content adjusted to effect shredding and to prevent powdering thereof, and carbonizing the milled material at a temperature range between 450° C. and 950° C. to produce carbon particles having an interlocked fibrous branching formation and a reticulate structure.

2. The method as defined in claim 1, wherein the moisture content of said material during milling is about 40%.

3. The method as defined in claim 1, wherein said material is subjected to milling until it will pass a screen of 60-mesh per inch.

4. The method as defined in claim 1, wherein the milled material is subjected to heat treatment at a temperature of substantially 800° C.

5. A carbon product for use in the separation of fluids, consisting of particles of carbon having a fibrous, fern-like branching formation and which form a reticulate mass in which the particles interengage and form an open structure.

References Cited in the file of this patent

UNITED STATES PATENTS

| | | |
|---|---|---|
| 796,019 | Sahlstrom | Aug. 1, 1905 |
| 2,234,769 | McCulloch | Mar. 11, 1941 |
| 2,304,351 | Goss et al. | Dec. 8, 1942 |
| 2,516,233 | McKinnis | July 25, 1950 |

FOREIGN PATENTS

| | | |
|---|---|---|
| 223,929 | Great Britain | Oct. 25, 1924 |
| 594,641 | Great Britain | Nov. 17, 1947 |
| 18,875 | Australia | Aug. 14, 1934 |